United States Patent [19]

Winters

[11] 3,872,248

[45] Mar. 18, 1975

[54] FACSIMILE APPARATUS

[75] Inventor: Luther R. Winters, Orlando, Fla.

[73] Assignee: Exxon Research and Engineering Company, Linden, N.J.

[22] Filed: Feb. 16, 1973

[21] Appl. No.: 332,927

[52] U.S. Cl. .................. 178/7.6, 178/6.6 HS, 178/6, 178/DIG. 27, 178/6.6 DD

[51] Int. Cl. .................. H04n 1/14

[58] Field of Search ............. 178/7.6, 6.6 HS, 6.6 R, 178/6.6 DD, 6, DIG. 27; 346/139 R, 139 D

[56] References Cited

UNITED STATES PATENTS

| | | | |
|---|---|---|---|
| 1,754,503 | 4/1930 | Dwelle | 346/139 D |
| 3,201,512 | 8/1965 | Mason et al. | 178/6 |
| 3,280,251 | 10/1966 | Nakahara | 178/6 |
| 3,585,289 | 6/1971 | Huber | 178/6.6 R |
| 3,735,040 | 5/1973 | Punt et al. | 178/7.6 |
| 3,739,095 | 6/1973 | Alden | 178/7.6 |

*Primary Examiner*—Howard W. Britton
*Assistant Examiner*—Edward L. Coles
*Attorney, Agent, or Firm*—N. Norris

[57] ABSTRACT

A facsimile transceiver comprising a document/copy receiving drum, a motor for rotation of the drum about the drum axis and a read/write head having a fiber optic scanner mounted on a rotating shaft for linear movement in a direction parallel with the drum axis. The head comprises a plurality of rollers having axes slightly skewed with respect to the axis of the shaft to advance the head as the shaft rotates. By biasing the head so as to pivot about the shaft into contact with a document carried by the drum, the appropriate spacing between the end of the fiber optic scanner and the document being scanned is assured.

14 Claims, 16 Drawing Figures

FACSIMILE APPARATUS

RELATED APPLICATIONS

Certain aspects of the facsimile apparatus disclosed herein are also disclosed in the copending applications of Richard L. Nelson, Ser. No. 333,616 filed Feb. 20, 1973 (Attorney's Docket M—441/RM—677) and Ser. No. 333,615 filed Feb. 20, 1973 (Attorney's Docket M—442/RM—678), both of which are assigned to the assignee of this invention.

BACKGROUND OF THE INVENTION

This invention relates to facsimile systems comprising a transmitter, a receiver and communications network such as telephone lines therebetween. The transmitter includes a scanning reading element which reads the information content of an original document. The original document is moved relative to the reading means such that successive paths are scanned whereupon the output of the scanning element is fed to a device such as a photodetector which converts the variations in light intensity received by the scanning element due to variations in the reflectivity of the scanned document to electrical signals. These electrical signals then convey the information concerning the radiation and absorption, emission or reflection of the scanned document. The electrical information-bearing signals are then transmitted to a receiving unit over suitable means such as a telephone network where the receiving unit converts the electrical information-bearing signals from the transmitting unit to marks or images on a receiving copy medium so that the received copy is a reasonable facsimile of the original scanned document.

In commercially available facsimile systems, the document being scanned is placed in circumscribing relationship about a rotating drum adjacent a scanning optical system which moves in a direction generally parallel with the rotating drum axis. As the drum rotates and the head advances, successive paths on the document are scanned. In the commercially available systems, the optical systems are of a lens type which are characterized by a sufficiently large focal length to permit substantial separations between the head carrying the lens system and the document carried on the drum. However, the lens optical systems which are capable of achieving the necessary level of resolution are extremely expensive and constitute a considerable portion of the overall cost of a rather expensive transceiver.

As an alternative to the expensive lens systems, the use of fiber optics in the optical scanning system of facsimile transceivers has been suggested. U.S. Pat. No. 3,588,514 - Simpkins discloses the use of a reading fiber optic which is surrounded by a plurality of illuminating fiber optics located in the recess of a block which rides on the surface of a document. The document, which does not circumscribe a rotating drum, is maintained in a substantially planar position.

U.S. Pat. Nos. 3,201,512 - Mason et al., 3,448,207 - Green et al. and 3,553,366 - Brouwer disclose the use of fiber optics in combination with a lens for scanning a document which circumscribes a rotating drum located some distance from the drum. However, none of these patents suggests a way in which rather close and precise spacing may be maintained between the end of the scanning fiber optics and the document which circumscribes the drum.

SUMMARY OF THE INVENTION

It is an object of this invention to provide a facsimile apparatus which is capable of maintaining a close and precise spacing between the optical scanning means and a document being scanned by the optical scanning means.

It is a more specific object of this invention to provide a facsimile apparatus capable of maintaining a close and precise spacing between fiber optic scanning means and a document carried by a rotating drum.

In accordance with thesse objects, a preferred embodiment of the invention comprises a document-carrying drum having an axially extending discontinuity in the surface thereof, means for mounting the drum for rotational motion about the drum axis and means for driving the drum through rotational motion about the drum axis. A reading head is supported on means for moving the head along the surface of the drum in a direction parallel to the axis of the drum with fiber optic scanning means mounted in a fixed position on the head for detecting the information content of a document carried by the drum. Bias means are provided for moving the head toward the drum to allow the head to ride on the document carried by the drum thereby maintaining a fixed distance between the document and the optical scanning means.

In accordance with one important aspect of the invention, the scanning means comprises at least one reading fiber optic and a plurality of illuminating fiber optics which substantially surround the reading fiber optic.

In accordance with another aspect of the invention, the means for supporting the reading head comprises a single shaft with the biasing means causing the head to pivot about the shaft into contact with the document carried by the drum. The single shaft may have a substantially smooth surface which engages rollers which are mounted on the head where the rollers have axes which are slightly skewed with respect to the axis of the shaft so as to cause the head to advance as the shaft rotates. Roller bias means may be provided to maintain substantial contact between the rollers and the shaft.

In accordance with another aspect of the invention, the rollers are mounted on separable portions of the head so as to permit disengagement between the rollers and the shaft and thereby permit the head to slide freely on the shaft without substantial resistance from the rollers. This permits the head to be moved freely back and forth along the drum.

In accordance with another important aspect of the invention, the head is provided with cutting means which are capable of severing a copy medium along a line parallel with the axis of the drum. The cutting means is mounted on a cutter support means which allows the cutting means to be selectively brought into cutting engagement with the copy medium. The cutter support means is capable of actuating a release means for overcoming the bias on the rollers when the cutting means is brought into engagement with the copy medium.

DETAILED DESCRIPTION OF A PREFERRED EMBODIMENT

Figure 1:
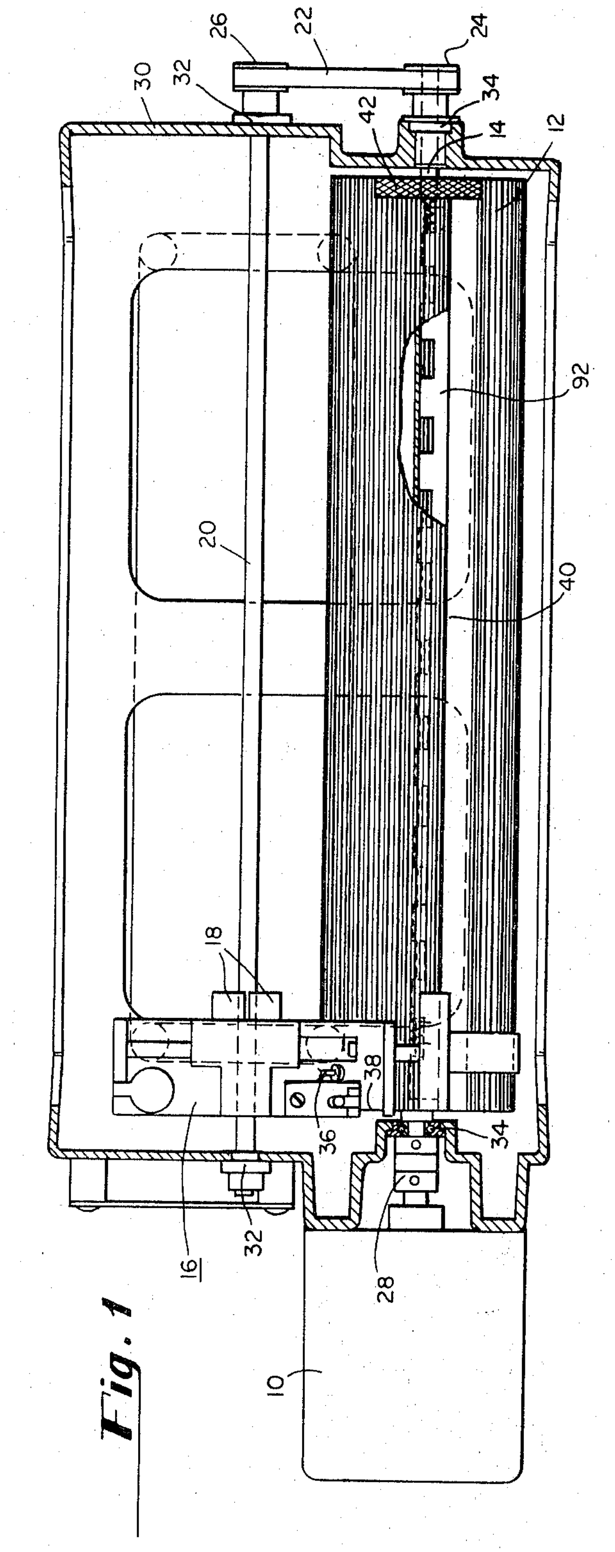
FIG. 1 is a top plan view of a facsimile transceiver constructed in accordance with the invention.
Figure 2:
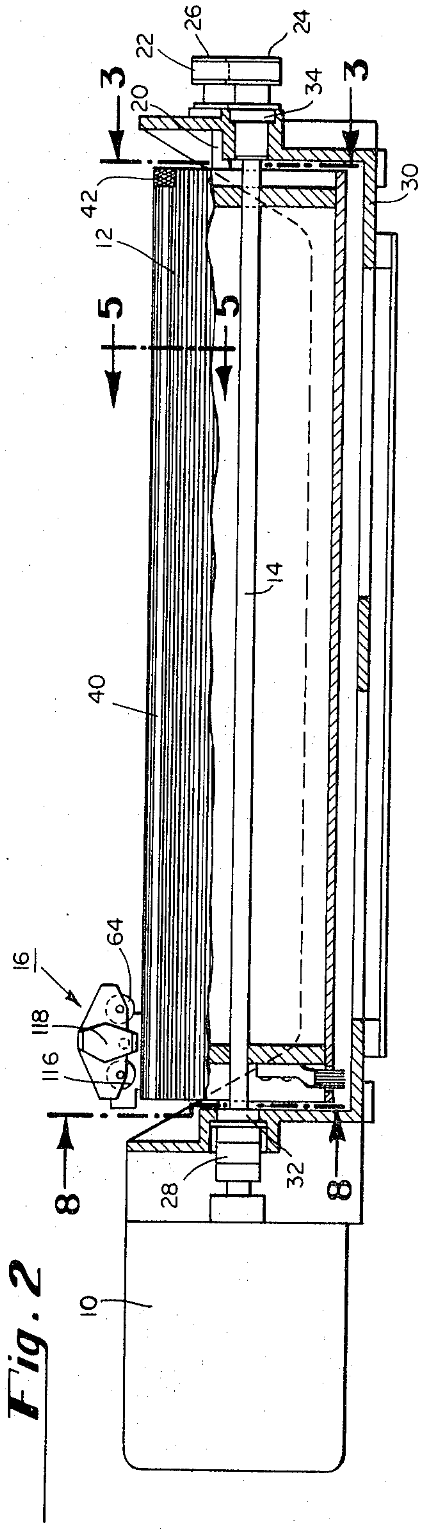
FIG. 2 is a front view of the transceiver shown in FIG. 1.
Figures 3, 7:
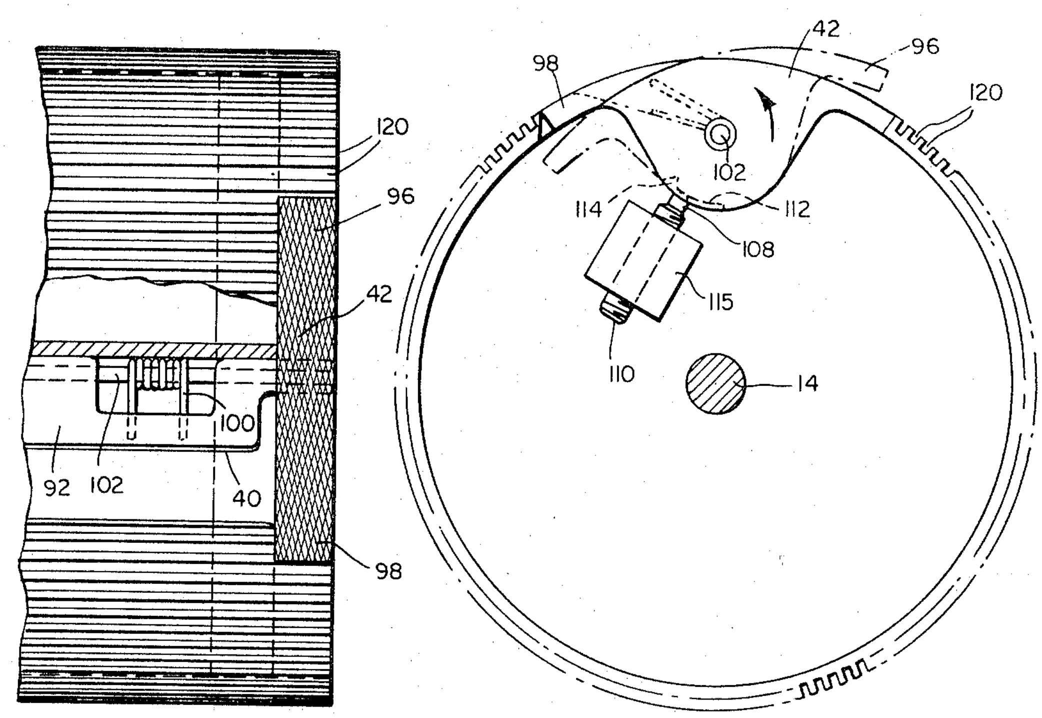
FIG. 3 is a sectional view of the facsimile transceiver shown in FIG. 2 taken along line 3—3.
FIG. 7 is an enlarged fragmentary view of the end of the transceiver drum with the copy clamp in the closed position.

Referring to FIGS. 1 and 2, a facsimile transceiver comprises a synchronous motor 10 which drives a document/copy receiving drum 12 rotatably about a drum shaft 14 which extends along the drum axis while also driving a scanning head 16 along a substantially linear path parallel to the drum axis. The head is advanced along the linear path by the cooperation between a head drive mechanism 18 and a shaft 20 which is located rearwardly and parallel to the drum shaft and is also driven by the motor 10 via a belt 22 which couples the shaft 20 to the shaft 14. Pulleys 24 and 26 secured to the shaft 14 and 20 respectively are provided for the belt 22 while a flexible coupling 28 connects the motor drive shaft of the motor 10 to the shaft 14. The motor 10, the drum 12 and the head 16 are supported for rotation on a molded U-shaped frame 30 wherein the head shaft 20 and the drum shaft 14 are journaled in bearings 32 and 34 respectively. A one direction clutch is provided to prevent shaft 14 from rotating in a reverse direction.

In accordance with the invention of Richard L. Nelson which forms the subject matter of the aforesaid copending application Ser. No. 333,615, the head 16 shown in FIGS. 1 and 2 is a read/write head giving the transceiver the capability of transmitting information scanned by the head on an original document applied to the drum 12 while also having the capability of receiving and then writing on a copy medium applied to drum 12 as the head 16 scans in a direction parallel with the axis of the rotating drum 12. More particularly, the head 16 comprises an optical scanner including a bundle of fiber optics 36 which extend through an opening into close proximity with the surface of the drum 12. The fiber optics serve to detect light-dark variations inn the original document applied to the drum when the transceiver is operating in the transmitting mode. The head 16 also includes a stylus 38 which extends into contact with an electrosensitive copy medium carried by the drum so as to mark the copy medium in accordance with a received information-bearing signal applied to the transceiver when operating in the receiving mode.

The copy medium applied to the drum 12 forms a closed or endless loop circumscribing the drum so as to eliminate the necessity for synchronizing the initial relative angular position of the orignal document on a transmitting transceiver drum with respect to the scanning head 16 and the initial relative angular position of the copy medium on a receiving transceiver drum 12 with respect to the scanning head 16. In this connection, the drum 12 includes a surface discontinuity comprising an axialy extending slot 40 which extends along the entire length of the drum 12 at the periphery thereof. The slot 40 includes a clamping mechanism associated therewith which is opened and closed by a finger engageable member 42. The nature of the copy medium which is inserted into the slot 40 is the invention of and described in the copending application of Richard L. Nelson, Ser. No. 333,616, which is incorporated herein by reference.

Figure 5:
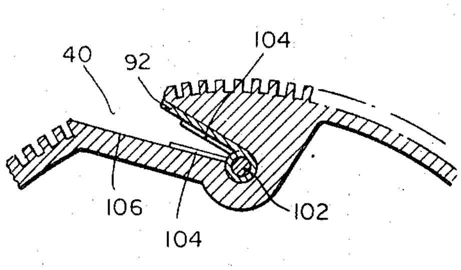
FIG. 5 is a sectional view of the drum shown in FIG. 1 taken along section line 5—5 with the copy clamp closed.
Figure 6:
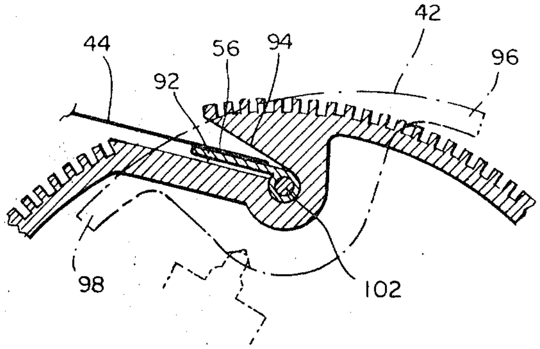
FIG. 6 is a sectional view of the transceiver drum shown in FIG. 1 taken along section line 5—5 with the copy clamp open.

Reference will now be made to FIGS. 3 and 5-7 for a detailed description of the clamping mechanism. As shown in FIG. 6, a movable clamping member 92 which extends substantially along the entire length of the drum in a direction parallel with the drum axis is in the open position so as to receive an edge of a copy medium sheet, i.e., a portion 56 of a sheet 44. The clamping member 92 encircles a shaft 102 extending through the base of the slot 40 and is free to rotate on the shaft between open and closed positions. In the open position, the finger engageable member 42 assumes the position shown in broken lines in FIGS. 3 and 6. Once the portion 56 is in place between the movable clamping member 92 and the surface 94 of the drum 12 which forms a stationary clamping member, the finger engageable clamping member 42 may be depressed at the end 96 so as to close the movable clamping member 92 against the clamp surface 94 and trap the strip 56 of the sheet 44 therebetween.

The resulting closed position is depicted in FIG. 5 absent the sheet member 44. In order to release the sheet 44 from the clamping mechanism, the other end 98 of the finger engageable member 42 may be depressed so that the clamping mechanism may again assume the position shown in FIG. 6.

In order to maintain the clamping mechanism in the closed position, a spring bias is provided by spring members 100 which also encircle the shaft 102 extending through the base of the slot 40. The ends 104 of the spring 100 press against the back side of the movable clamping member 92 and a slot surface 106 forcing the movable clamping member 92 up against the slot surface 94. However, by pushing on the end 98, detent 108 carried at the end of an adjustable screw 110 will move through a groove 112 on the interior side of the clamping member 42 and will ultimately drop into a depression 114. This depression 114 is of sufficient depth to hold the clamping mechanism open even though the spring 100 tends to urge it closed. Only when additional pressure is applied to the end 96 of the clamping member 42 will the member 42 move in a manner so as to allow the detent 108 to ride out of the depression 114 and through the groove 112. The detent which is carried by the end of the screw 110 is adjustable in relation to the depression 114 by adjusting the position of the screw 110 in a block 115. In this manner, an edge of the copy medium may be clamped into place along an edge thereof extending parallel with the axis of the drum 12.

Figure 8:
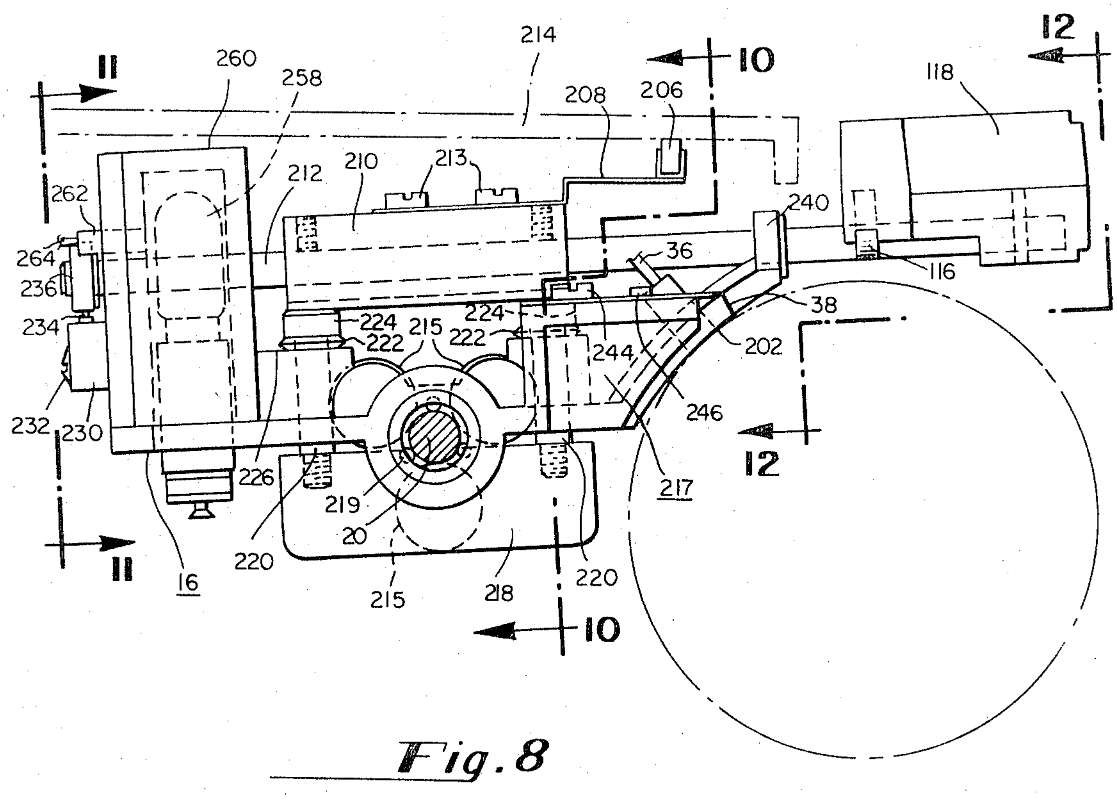
FIG. 8 is a side view of the scanning head of the transceiver shown in FIG. 2 taken along line 8—8.
Figure 13:
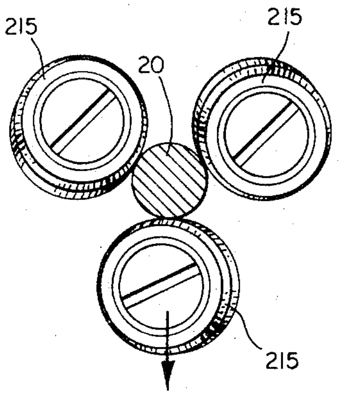
FIG. 13 is a view of the scanning head drive mechanism taken along line 13—13 of FIG. 10.

In accordance with another important aspect of the invention in the aforesaid copending application Ser. No. 333,616, a cutting roller 64 is rotatably carried by the head 16. As best shown in FIG. 2, the head includes the cutting roller 64 as well as an opposite relatively soft roller 116. In the receiving or transmitting mode, the head 16 will advance in a direction generally parallel with the axis of the drum 12 with neither the cutting roller 64 or the soft roller 116 in contact with the copy medium or original document carried by the drum. By manually twisting a head knob 118 which projects forward from the head 16, the cutting roller 64 or the roller 116 may be brought into contact with the copy medium. By twisting in a clockwise direction, the roller 64 is brought into contact with the copy medium to allow the roller 64 to engage and sever the copy medium as the head 16 is moved manually or automatically along a line parallel with the axis of and generally above the drum 12. Prior to severing the copy medium, the drum must be rotated to a position so that the cutting roller 64 will engage the copy medium along a line which will establish an appropriate margin for the information content on the copy medium. If the knob 118 is rotated in a counterclockwise direction, the roller 116 will be brought into contact with the copy medium. As shown in FIG. 8, the roller 116 is rather broad so as to ride easily along the surface of the copy medium on the drum 12.

In order to assist in guiding the cutting roller 64 along a straight line so as to provide a suitable edge for the copy medium after severing, the drum 12 comprises a plurality of grooves 120 which extend axially along the drum as shown in FIGS. 3–7. By providing a close and frequent spacing between the grooves 120, it is possible to sever the copy medium along any one of a number of closely spaced lines. This assures that the copy medium may be severed along a line so as to establish a suitable margin for the information on the copy medium.

Figure 4:
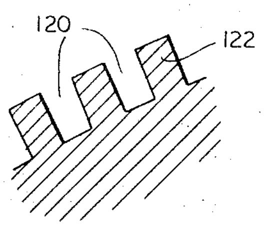
FIG. 4 is an enlarged view of the grooves in the surface of the drum shown in FIG. 3.

As shown in FIG. 4, the grooves 120 are separated by blunt projections 122. It will of course be appreciated that the projections 122 as well as the relatively flat bases of the grooves 120 may have a different configuration although this particular configuration is deemed to be desirable since it does provide for more contact between the cutting roller 64 and the surface of the grooves.

Figure 9:
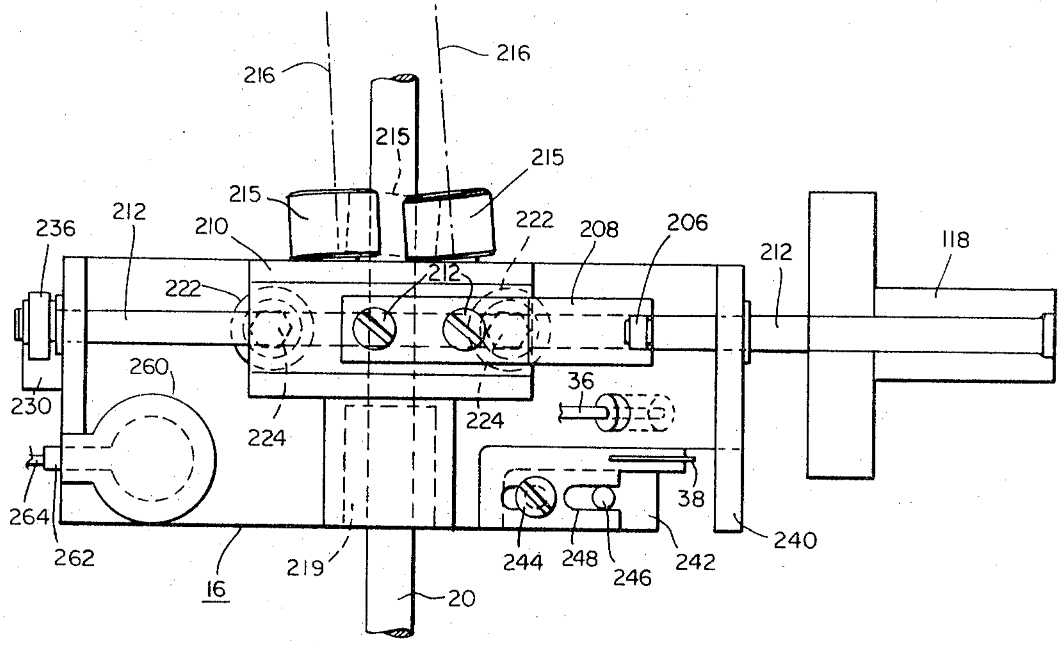
FIG. 9 is a top view of the scanning head shown in FIG. 8.

In accordance with this invention, the head 16 is driven by and mounted on the single drive shaft 20 as shown in FIGS. 8 and 9. The head is then rotatably biased around the shaft 20 to a position of engagement between arcuate surface 202 of the head member which also carries the bundle 36 of fiber optics. Since the arcuate surface 202 is maintained in contact with the document carried by the drum 12 and the spacing between the surface 202 and the fiber optic is fixed, the distance between the ends of the fiber optics 36 and the document is thereby fixed even when the portions of the document adjacent the slot 40 are being scanned; since the head bridges and is not received by the slot. The critical distance between the ends of the fiber optics and the document being scanned is thereby maintained so as to optimize the scanning of the document in accordance with the invention of the aforesaid copending application Ser. No. 333,615, which is also incorporated herein by reference. In assure to assur that the distance remains fixed, the area of contact of the document by the surface 202 and the area of optical communication with the fiber optics are on a line parallel with the axis of the drum and perpendicular to the motion of the document at that line.

In order to rotatably bias the arcuate surface 202 into contact with the document carried on the drum 12, a roller 206 is carried by a resilient arm 208 which is attached to a cam member 210 coupled to a head control shaft 212 which extends generally perpendicularly to the axis of the drum 12 and the drive shaft 20. The resilience of the arm 208 which is attached to the cam 210 by threaded fasteners 213, rides along the interior surface of an upper transceiver casing member 214 shown in broken lines. The casing member 214 pushes against the roller 204 tending to rotate or pivot the head 16 in a counterclockwise manner so as to force the surface 202 against the document carried by the drum 12 thereby assuring the proper spacing between the fiber optics 36 and the document.

In accordance with another aspect of this invention, the drive mechanism of the head 16 which advances the head as the shaft 20 rotates comprises a plurality of skewed rollers or cam followers 215 which engage the shaft 20 at different angular positions. By skewing the axis 216 of each of the rollers 215 with respect to the shaft 20 as best shown in FIG. 9, rotation of the smooth rollers 215 by the shaft 20 in turn advances the head 16 along the shaft 20. In order to provide for this advancement, each of the axes 216 is skewed a very small angle in a plane parallel to the plane of tangency between the roller 215 and the shaft 20. In order to optimize the resolution of the facsimile system, the head 16 must be advanced very slowly and this calls for a very small angle of skewing, preferably less than one degree. In this manner, a single shaft 20 is able to drive as well as support the head 16 without the use of threads on an additional drive shaft. Bearings 219 are also provided in the head 16 at the end opposite the rollers 215 to support the head on the shaft 20.

In order to permit the head 16 to be more easily advanced axially along the drum 12 independently of the head drive, the rollers 215 are mounted so as to permit the rollers 215 to disengage the shaft 20. In this connection, two of the rollers 215 are mounted on a head member 215 which forms the upper and principal portion of the head 16, and a third roller 215 is mounted on a relatively movable head member 218 which forms the lower portion of the head. Threaded fasteners 220 extend through holes in the upper head member 217 and engage the lower head member 218. In order to bias the rollers 215 into contact with shaft 20, compressible rings 222 are provided between the head 224 of the fasteners 220 and adjacent surfaces of the upper head member 217. The rings 222 then serve to separate the heads 224 from the surface 226 thereby forcing the upper rollers 215 toward the lower roller 215 which in turn results in engagement between the rollers 215 and the shaft 20.

Figure 10:
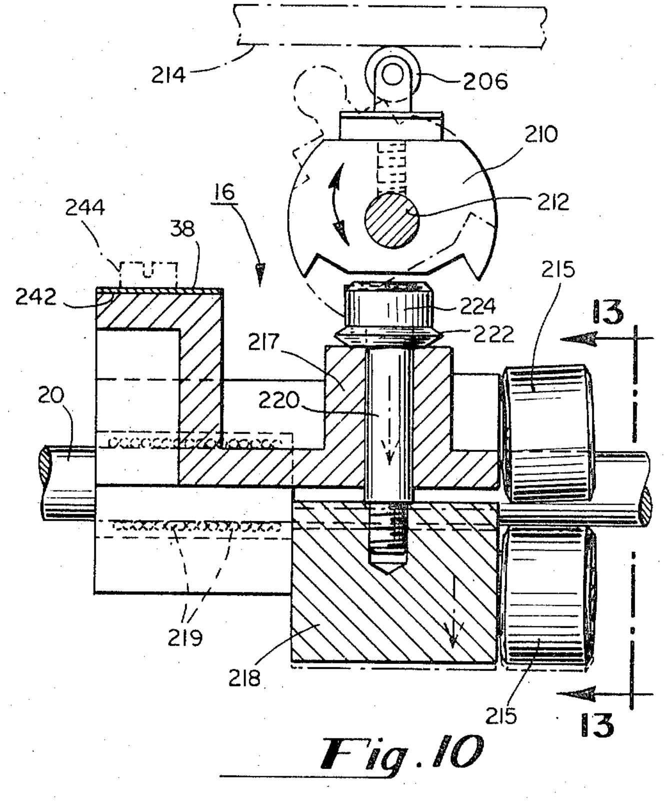
FIG. 10 is a sectional view of the scanning head taken along section line 10—10 of FIG. 8.

In order to disengage the rollers from the shaft 20 and thereby more easily manually move the head assembly along the drum axis the knob 118 is twisted in a clockwise or counterclockwise direction. This will rotate the shaft 212 to which the knob 118 is secured and this will in turn rotate a cam 210 secured to the control shaft 212 to a position of engagement with the tops of the heads 224 as shown in broken lines in FIG. 10. This in turn will compress the ring 222 as the threaded fastener 220 is forced downwardly thereby separating the upper rollers 215 from the lower rollers 215 to disengage the shaft 20. Once the rollers have been disengaged from the shaft 20, the head 16 may be moved along the shaft with great ease to permit the copy medium to be severed by the cutting roller 64 which is also supported by the control shaft 212. In the alternative, the knob 118 may be twisted in a counterclockwise direction which also serves to disengage the rollers for the shaft 20 to allow the head 16 to be easily repositioned as the soft roller 116 shown in FIGS. 8 and 11 rolls axially along the drum. Twisting of the knob 118 also releases the bias on the head which forces the surface 202 toward the drum by rotating the roller 116 away from the surface 214 thereby allowing the head to slide more easily along the shaft 20 while avoiding contact between the stylus 38 and the copy medium which might otherwise result in the snagging or severing of the copy medium.

Figures 11, 12:
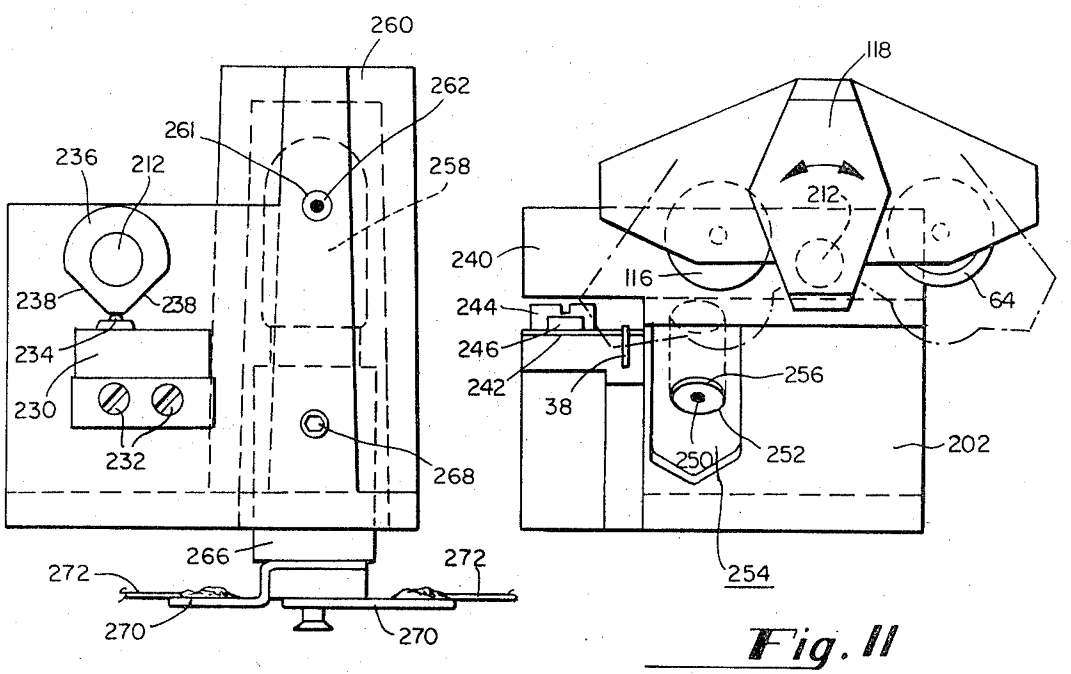
FIG. 11 is an end view of the scanning head of FIG. 8 taken along line 11—11.
FIG. 12 is an end view of the scanning head of FIG. 8 taken along line 12—12.

Another important aspect of the head 16 involves the use of the shaft 212 to open and close a switch which controls the application of power to the stylus 38. In this connection, FIGS. 8 and 12 show a micro-switch 230 secured to the rear of the head 16 by screws 232. The switch 230 includes an actuatable member 234 which projects into contact with a cam 236 attached to the end of the control shaft 212. Whenever the control shaft 212 is rotated by twisting the knob 218 corresponding to manual movement of the head 16, the actuatable projection 234 will be allowed to rise as cam surfaces 238 move into contact therewith and this interrupts the application of power to the stylus 38. Thus, when the head must be handled by an operator to adjust its position, the power to the stylus is interrupted so that any contact between the operator's fingers and the stylus would not be injurious to the operator. In addition, the stylus 38 is recessed behind a member 240 as best shown in FIGS. 8 and 9. As also shown in these Figures, the stylus 38 is mounted on a shelf 242 of the upper head member 217. However, to hold the proper position for the stylus 38 on the shelf 242, a screw 244 extends down into the shelf and an integral projection 246 extends into a slot 248 of the stylus 38.

Figure 16:
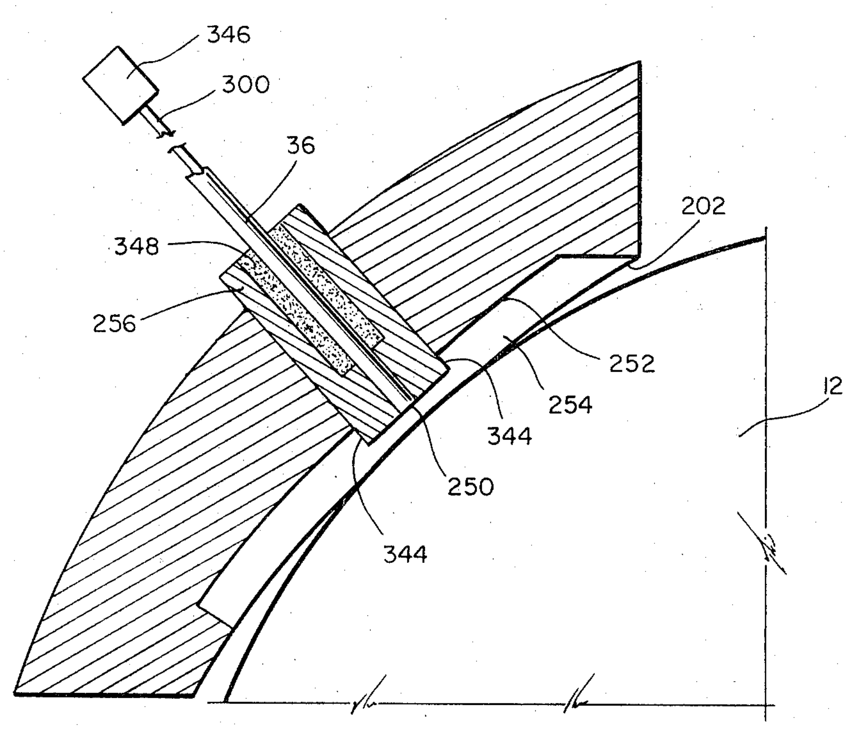
FIG. 16 is an enlarged sectional view of the head and drum shown in FIGS. 1-13 with the fiber optic scanning means of FIGS. 14 and 15.

Referring now to FIGS. 11 and 16, the surface 202 rides on the document carried by the drum 12 so as to maintain the appropriate spacing between the end 250 of the fiber optics 204 and the document carried by the drum 12. In accordance with the invention disclosed in copending application Ser. No. 333,615, the ends 250 of the fiber optics 36 extend slightly beyond the base 252 of the recess 254 in the surface 202. This prevents the collection of dirt on the ends 250 of the fiber optics 36 since the dirt tends to collect around a fiber optic protective jacket 256 which surrounds the fiber optics 36 rather than on the ends 250 of the fiber optics themselves. Note that the fiber optic spacing from the document carried by the drum 12 is maintained since the recess 254 is deeper in the surface 202 than the overall protrusion of the ends 250 of the fiber optics from the base 252 of the recess 254.

In order to illuminate the area of the document being scanned,, the bundle of fiber optics 36 includes a plurality of fiber optics which are optically coupled to a light source 258 enclosed within a housing 260 located at the rear of the head 16. An infrared absorbing filter may also be used to facilitate detection of blue ball point. As shown in FIGS. 8 and 12, a jacket 262 extends through an opening 261 in the housing 260 which receives a bundle of illuminating fiber optics 264. At least one additional fiber optic extending into the recess 254 is provided for detecting the way in which the light from the illuminating fiber optics is absorbed, emitted or reflected from the document being scanned by the head 16. This detecting fiber optic is then coupled to a suitable photodetector such as a photodiode or phototransistor. The illuminating fiber optics which extend between the light source 258 and the recess 254 have not been shown nor has the detecting fiber optic which extends from the recess 254 to the photodetector.

As shown in FIG. 12, the light source 258 comprises a bulb mounted in a socket 266 which is secured to the housing 260 by a fastener 268. The socket 266 includes terminals 270 which are connected to a suitable power source by leads 272.

Figure 14:
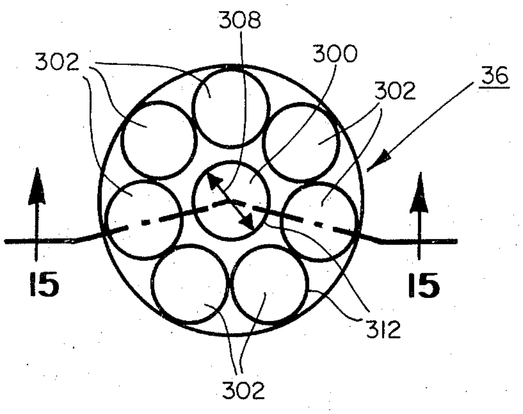
FIG. 14 is an end view of the fiber optic scanning means for the head of FIGS. 3 and 4.
Figure 15:
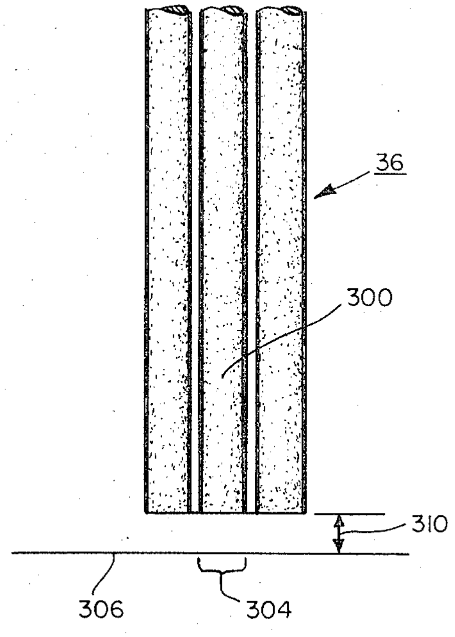
FIG. 15 is a sectional view of the fiber optic scanning means of FIG. 14 taken along line 15—15.

FIGS. 14 and 15 depict a bundle of fiber optics 36 which protrude from the base of the recess 254 in the surface 202. As shown, a single reading fiber optic 300 is centrally located with respect to a plurality of illuminating fiber optics 302 which establish a light conducting medium substantially surrounding the reading fiber optic 300. By surrounding the reading fiber optic in this manner, the illuminating fiber optics are able to adequately illuminate the area 304 of a document 306 as shown in FIG. 15 even though the end of the reading fiber optic 300 is spaced from the document 306 a distance of from 30 to 300 percent of the maximum cross-sectional dimension 308 of the reading fiber optic 300. Thus where the diameter of the reading fiber optic is 0.010 of an inch, the distance 310 between the end of the fiber optic 300 and the document 306 will lie between 0.003 and 0.030 inch, and preferably greater than 0.003 of an inch to assure proper illumination. The range of 100 to 150 percent or 0.010 to 0.015 inch has been found to be most satisfactory when the reading fiber is 0.010 inch in diameter. This spacing permits a very good resolution of the light-dark variations detected by the reading fiber optic 300.

As utilized herein, the term fiber optics refers to fibers of a glass or plastic nature which, as shown in FIG. 14, may be clustered together to form a bundle. In principle, light entering one end of the fiber is transmitted to the other end by a process of total internal reflection. To prevent leakage from a fiber, it may be insulated with a coating 312 of lower refractive index than that of the fiber itself. Bundled plastic fiber optics of this type may be purchased from DuPont under the designation Crofon or suitable glass fiber may be purchased from the Corning Glass Works.

In accordance with the invention of the aforementioned copending application Ser. No. 333,615, the reading fiber optic protrudes from the base of the recess 254 in the surface 202. As shown in FIG. 16, the bundle of fiber optics 36 shown in FIGS. 9 and 10 protude from the base 252 of the recess 254. In order to protect the bundle 36, the ends of the fibers 300 and 302 are flush with the end of the jacket 256 which itself protrudes beyond the base 252 into the recess 254. By providing this protrusion of the fiber optics into the recess 254, foreign matter in the form of dirt and dust will collect along the edges 344 of the jacket 256 and not at the ends of the fibers 36. Yet, the critical spacing between the end of the fiber optic 300 is maintained by providing the recess 254 with the appropriate depth.

As also shown in FIG. 16, the reading fiber optic 300 is coupled to a semiconductor photodetector 346. The illuminating fiber optics 302 (not shown in FIG. 16) are of course coupled to the source of light 258 shown in FIG. 12. In order to hold the bundle of fiber optics 36 in place within the jacket 256, a suitable cement 348 may be utilized.

Although a specific embodiment of the invention has been shown and described, other embodiments and modifications may occur to those of ordinary skill in the art, and the appended claims are intended to cover any such modifications which fall within the true spirit and scope of the invention.

What is claimed is:

1. A facsimile system comprising:
- a document-carrying drum having at least one surface discontinuity extending parallel to the axis of said drum;
- means for mounting said drum for rotational motion about said drum axis;
- means for driving said drum through said rotational motion about said drum axis;
- a reading head;
- means for supporting said reading head for movement along the surface of said drum in a direction parallel to said axis of said drum;
- fiber optic scanning means mounted in a fixed position on said head for detecting the information content on a document carried by said drum; and
- means for biasing said head toward said drum to allow said head to ride on the document carried by said drum thereby maintaining a fixed distance between said document and said fiber optic scanning means.

2. The facsimile system of claim 1 wherein said discontinuity comprises a slot for receiving the edge of a document.

3. The facsimile system of claim 1 wherein said fiber optic scanning means comprises a plurality of fiber optics, at least one of said fiber optics transmitting light to said drum so as to illuminate the information content on said document and at least one other of said fiber optics transmitting light reflected from said document representing the information content of the document.

4. The facsimile system of claim 3 wherein said means for supporting said head comprises a single shaft, said means for biasing said head toward said drum causing said head to pivot about said shaft into contact with the document carried by said drum.

5. The facsimile system of claim 4 including drive means coupled to said single shaft for rotation thereof, said head including means engaging said rotating shaft for advancing said head along said shaft.

6. The facsimile system of claim 5 wherein said means for advancing said head comprises roller means engaging said shaft, said roller means having axes slightly skewed with respect to the axis of said shaft so as to cause said head to advance as said shaft rotates.

7. The facsimile system of claim 6 wherein said roller means comprises a plurality of rollers, said head comprising separable portions forming an opening receiving said shaft at the junction therebetween, each of said portions having at least one of said rollers mounted thereon, said head further comprising bias means for maintaining said separable portions in close proximity so as to maintain said rollers in contact with said shaft under facsimile operating conditions.

8. The facsimile system of claim 7 further comprising release means for overcoming said bias means so as to separate said separable portions and thereby permit said head to slide more freely on said shaft without substantial resistance from said rollers.

9. The facsimile system of claim 8 wherein said head further comprises stylus means for marking on a copy medium carried by said drum when said system is utilized in the receiving mode, said head further comprising means for cutting the copy medium along a line parallel with the axis of the drum and cutter support means permitting said cutting means to be selectively brought into cutting engagement with the copy medium, said cutter support means actuating said release means to overcome said bias means when said cutting means is brought into engagement with the copy medium.

10. A facsimile system comprising:
- a document-carrying drum comprising a substantially cylindrical surface including at least one discontinuity in said surface extending substantially parallel to the axis of the drum for receiving an edge of the document;
- means for mounting said drum for rotational motion about the axis of the drum;
- motor means coupled to said mounting means for driving said drum through rotational motion about the drum axis;
- a reading head comprising fiber optic scanning means including a plurality of fiber optics, at least one of said fiber optics transmitting light to said document so as to illuminate the information content on the document and at least one other of said fiber optics transmitting light reflected from the document representing the information content of the document, said head comprising a surface adapted to contact said document and bridge said discontinuity;
- means for mounting said head with said contact surface juxtaposed to the document of said drum; and
- means for biasing said head toward said drum so as to force said contact surface into contact with the document, said head riding on said document during scanning so as to maintain a substantially fixed distance between the ends of the fiber optics and the document including portions thereof adjacent but not received by said discontinuity.

11. The facsimile system of claim 10 wherein said discontinuity comprises a slot for receiving the edge of a document.

12. The facsimile system of claim 10 wherein said biasing means comprises resilient means forcing said contact surface of said reading head into contact with the document.

13. The facsimile system of claim 10 wherein the area of the document in optical communication with said fiber optics and the area of the document contacted by the contact surface are on a line substantially parallel with the axis of the drum and the axial discontinuity in the surface of the drum and substantially perpendicular to the motion of the document.

14. The facsimile system of claim 13 wherein said contact surface comprises part of an arcuate surface of said head juxtaposed to the document on said drum.

* * * * *